(12) United States Patent
Boka et al.

(10) Patent No.: US 7,626,534 B1
(45) Date of Patent: Dec. 1, 2009

(54) UNIFIED NAVIGATION AND INERTIAL TARGET TRACKING ESTIMATION SYSTEM

(75) Inventors: Jeffrey B. Boka, Lumberton, NJ (US); Purusottam Mookerjee, Bridgewater, NJ (US); Naresh R. Patel, Bellmawr, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 154 days.

(21) Appl. No.: 11/818,041

(22) Filed: Jun. 12, 2007

(51) Int. Cl.
*G01S 13/72* (2006.01)
(52) U.S. Cl. ............... 342/90; 342/95; 342/97; 342/106; 342/109; 342/113; 342/115; 342/133; 342/140; 342/145; 342/146; 342/189; 342/195; 342/451
(58) Field of Classification Search .......... 342/59, 342/90, 95–97, 106–109, 113, 115, 133, 342/139, 140, 145–147, 159–162, 189, 195, 342/450, 451, 463
See application file for complete search history.

(56) References Cited

U.S. PATENT DOCUMENTS

| | | | |
|---|---|---|---|
| 4,489,322 A * | 12/1984 | Zulch et al. | 342/149 |
| 5,313,212 A * | 5/1994 | Ruzicka | 342/101 |
| 5,729,234 A | 3/1998 | Stetson, Jr. et al. | |
| 6,225,942 B1 * | 5/2001 | Alon | 342/59 |
| 6,957,072 B2 * | 10/2005 | Kangras et al. | 455/456.1 |
| 7,026,980 B1 | 4/2006 | Mavroudakis et al. | |
| 7,181,323 B1 * | 2/2007 | Boka et al. | 701/1 |
| 7,248,206 B1 * | 7/2007 | Boka et al. | 342/90 |

OTHER PUBLICATIONS

Dhar, S. "Application of a recursive method for registration error correction in tracking with multiple sensors." Proceedings of the American Control Conference, San Francisco, CA, Jun. 1993, 869-874.*
Chansarkar, M. And Kohli, S. "Solution to a Multisensor Tracking Problem with Sensor Registration Errors." IEEE Transactions on Aerospace and Electronic Systems, vol. 35, No. 1, Jan. 1999.*
Friedland, B. "Treatment of Bias in Recursive Filtering." IEEE Transactions on Automatic Control, vol. AC-14, No. 4, Aug. 1969.*

* cited by examiner

*Primary Examiner*—Thomas H Tarcza
*Assistant Examiner*—Cassi Galt
(74) *Attorney, Agent, or Firm*—Duane Morrs LLP

(57) ABSTRACT

A target tracking method uses sensor(s) producing target signals subject to positional and/or angular bias, which are updated with sensor bias estimates to produce updated target-representative signals. Time propagation produces time-updated target states and sensor positional and angular biases. The Jacobian of the state dynamics of a target model produces the state transition matrix for extended Kalman filtering. Target state vector and bias covariances of the sensor are time propagated. The Kalman measurement residual is computed to produce state corrections, which are added to the time updated filter states to thereby produce (i) target state updates and (ii) sensor positional and angular bias updates. The covariance of a state vector comprising target states and sensor positional and angular biases is propagated, producing measurement updated state covariance including (i) target position and velocity measurement covariance updates and (ii) the sensor positional and angular bias measurement covariance updates.

10 Claims, 4 Drawing Sheets

UNIFIED NAVIGATION AND INERTIAL TARGET TRACKING ESTIMATION SYSTEM

This invention was made with Government support under Contract N00024-03-C-6110 awarded by the Department of the Navy. The Government has certain rights in this invention.

FIELD OF THE INVENTION

This invention relates to the tracking of targets by the use of sensors which may have positional and or angular bias or misalignment, and processing of information to produce unbiased estimates of target states.

BACKGROUND OF THE INVENTION

Collaborative sensor coordination among the systems of a System of Systems (SOS) is currently being pursued by the Missile Defense Agency (MDA) to enhance both targeting and cueing accuracies in support of ballistic missile countermeasures or defense. The Navy is deploying its Cooperative Engagement Coordination (CEC) system which is intended to enable Aegis destroyers to pass tactical data among or between elements of the battle group. The MDA will require sensor coordination in order to provide effective and layered tactical and strategic missile defense in a missile defense System of Systems (SOS). Collaborative sensor coordination requires each element of a Missile Defense System to register its sensor(s) to local geodetic coordinate systems in order to minimize tracking and guidance errors, thereby reducing system handover and guidance errors between the target tracking and/or cueing systems and the interceptor(s). This "sensor registration" ultimately provides additional margin to the weapon system's pointing and divert error budgets, which in turn expands the battle space and enhances the overall warfare capability.

FIG. 1 illustrates a scenario 10 in which a first ship 1 and a second ship 2 lie at distances from a land mass 3. Item 6 represents the horizon. A communication satellite 4 is illustrated, and can communicate with both ships 1 and 2 by way of paths illustrated as "lightning bolts" 4a and 4b. Positional calibration measurements for ships 1 and 2 can be provided by global positioning system (GPS) signals 5s flowing from GPS satellites such as 5a and 5b, which follow various orbital paths, illustrated together as 5t. In the scenario 10 of FIG. 1, a hostile missile or target 12 is launched from a location 12s on land mass 3, and follows a path or trajectory 12t. In this scenario, defensive ship 2 is located closer to the missile launch site 12s than ship 1, and it acquires a sensor track earlier than ship 1. In this case, the sensor target track may use information from radar or infrared sensors. The target track information generated by ship 2 may be communicated to ship 1 by way of communications satellite 4, or it may be communicated by a direct path illustrated as 14. The sensors aboard ship 1 can fuse the data provided from the sensors aboard ship 1 with data from ship 2 to aid in acquiring its own track of the target missile 12. Ship 1 can then proceed to fire a weapon at the target missile 12. In the scenario 10 of FIG. 1, the weapon is an antimissile vehicle 16. Antimissile vehicle 16 follows a track 16t to intercept the target missile 12 at an intercept location 18.

Current technology in multisensor data fusion assumes that sensor and system bias registration techniques can be either (a) accounted for through covariance inflation techniques or (b) mitigated through use of 'buffer states.' The Cooperative Engagement Capability (CEC) System developed by Johns Hopkins University/Applied Physics Lab (JHU/APL), is an example of the covariance inflation technique. An example of the buffer state mitigation technique is described in U.S. Pat. No. 7,026,980 entitled MISSILE IDENTIFICATION AND TRACKING SYSTEM AND METHOD (MDOTS) and issued Apr. 11, 2006 in the name of Mavroudakis et al., This method uses the Unified Unbiased Rocket Equation Extended Kalman Algorithm (UUREEKA) described in U.S. patent application Ser. No. 10/972,943 entitled Computerized Method for Generating Low-Bias Estimates of Position of a Vehicle From Sensor Data, filed on Oct. 25, 2004 in the name of Boka et al. These techniques may under certain circumstances result in less-than-optimal fused track states attributable to sensor registration bias error.

The current art in sensor bias registration methods can be categorized into either real-time and non-real-time, and can alternatively be categorized as angular bias methods and positional bias methods. ARCHER, developed by Computer Science Corporation (CSC) and System Calibration Using Satellites (SCUS), developed by Lockheed Martin (LMCO), are examples of non-real-time method for angular registration bias estimation. Both of these methods make use of data in the form of satellite ephemeris to provide a reference which is used to estimate the angular bias error. SCUS and Instantaneous Sensor Alignment Auto-Calibration (ISAAC) described in U.S. patent application Ser. No. 11/149,692, filed Jun. 10, 2005 in the name of Boka et al are examples of angular bias registration methods. Sensor positional bias registration error amelioration or correction is described in U.S. patent application Ser. No. 11/504,561 and entitled "Method for Compensating for the Positional Errors of a Sensor," (GPSLess) filed on or about Aug. 14, 2006 in the name of Mookerjee et al.

Improved or alternative sensor registration techniques and or methods are desired.

SUMMARY OF THE INVENTION

A method according to an aspect of the invention is for target tracking. The method comprises the step of sensing a target to be tracked with at least one sensor, which sensor or sensors is/are subject to positional bias and angular bias. The sensor(s) produce target representative signals subject to sensor positional and angular biases. The sensor positional bias and the sensor angular bias are updated with any sensor positional bias updates and sensor angular bias updates, respectively, to thereby produce sensor positional-bias and angular-bias updated target representative signals. State time propagation is performed, including propagation of at least the sensor positional and angular bias and the target positional and velocity states of the sensor positional-bias and angular-bias updated target representative signals to produce time updated target states and sensor positional and angular biases. The Jacobian is computed of the state dynamics of a target model to produce the state transition matrix for extended Kalman filtering. Covariance time propagation is performed by time propagating the covariance of a state vector comprising at least position and velocity of the target and positional and angular bias of the sensor, to thereby produce time updated state covariance. A determination is made as to whether a sensor measurement update is available. If the sensor measurement update is not available, the steps of time propagating the state estimates, computing the Jacobian, and time propagating the state covariance matrix are repeated. If the sensor measurement update is available, the Kalman filter gain is determined and the Kalman measurement residual is computed. The Kalman measurement residual is weighted with the gain to produce state corrections, and the state corrections are added to the time updated target states and sensor positional and angular biases, to thereby produce updates of (i) target position and velocity state estimates, and (ii) sensor positional bias updates and sensor angular bias state estimates.

Using the Kalman filter gain, updates are made to the state covariance matrix which consists of (i) target position and velocity measurement covariance updates, and (ii) sensor positional bias measurement covariance updates and sensor angular bias measurement covariance updates.

In an advantageous mode, the method further comprises the step of transformation of coordinates of the state vector and state covariance of the Kalman filter. The transformation of coordinates may be between the sensor bias filter frame and an unbiased filter frame.

A method according to another aspect of the invention is for compensating for the positional and angular alignment errors of a sensor tracking a target with known acceleration. This aspect of the method comprises the step of defining the estimator state given by $$\underline{s} = \begin{Bmatrix} \underline{X}_E \\ \underline{\dot{X}}_E \\ \delta \underline{R}_E \\ \delta \underline{\theta} \end{Bmatrix}$$

and comprising the target position $X_E$, target velocity $\dot{X}_E$, and the positional bias $\delta R_E$ and angular bias $\delta\underline{\theta}$ of the sensor. This aspect of the method also comprises the step of applying to the sensed information any sensor positional bias update information and angular bias information, to produce updated sensed information. This updated sensed information ultimately provides improved target state information. State estimates are propagated from the previous time to the current time. From the Jacobian, the state transition matrix is computed for the extended Kalman filter algorithm. Using the state transition matrix, the covariance of a state vector is time propagated, comprising the position and velocity states of the target and the positional bias of the sensor In this advantageous mode, the step of propagating the state of the updated sensed information to produce time updated state estimates of the target position may further comprise the step of calculating a nonlinear propagation equation making use of the Jacobian matrix. Also in this advantageous mode, the step of propagating the state of the updated sensed information to produce time updated state estimates of the target position may further comprise the step of generating a Jacobian matrix which provides observability of the sensor positional bias or error and angular bias (registration error) through gravitation and coriolis forces. Further, the step of time propagating the covariance of the state vector of the target may comprise the step of time propagating a composite state vector, where the composite state vector comprises the position and velocity states of the target and the position bias and angular bias of the sensor. The advantageous mode may further comprise, after the step of time propagating the covariance of a state vector comprising the position and velocity states of the target, the step of determining if target position information is available, and if target position is available, performing the further steps of calculating gain of the Kalman filter to generate Kalman filter gain. This advantageous mode may further comprise, after the step of calculating gain of the Kalman filter to generate Kalman filter gain, the step of generating updates of the state estimates of the target and of the covariance of the states.

A method for estimating the position of a target with the aid of a sensor the position and angular orientation is not known accurately according to another aspect of the invention comprises the steps of operating the sensor to generate sensed information relating to the position of the target, and adding to the sensed data any sensor positional bias update information and sensor angular bias information to produce updated sensed information. The state of the updated sensed information is propagated in time to produce time updated state estimates of the target position and velocity. The Jacobian of the state dynamics of the target is computed. The state transition matrix for the extended Kalman filter algorithm is computed. The covariance of a state vector comprising the position and velocity states of the target is propagated in time to thereby produce positional error information and angular bias information relating to the target tracking.

A method for estimating the position of a sensor and the angular bias orientation of a sensor according to another aspect of the invention comprises the steps of operating a sensor to generate sensed data relating to a target, which data is contaminated by sensor positional bias errors and angular bias registration errors, and adding to the sensed data any sensor positional bias update information and sensor angular bias update information to produce updated sensed information. The state of the updated sensed information is propagated in time to produce time updated state estimates of the target position and velocity. The Jacobian of the state dynamics of the target is computed. The state transition matrix for the extended Kalman filter algorithm is computed. The covariance of a state vector comprising the position and velocity states of the target is time propagated.

A method for estimating the error in the position of a sensor and the angular bias orientation of the sensor according to another aspect of the invention comprises the steps of operating a sensor to generate data relating to a target, which data is contaminated by sensor positional bias errors and angular bias registration errors. The method comprises the steps of operating the sensor to generate sensed information relating to the target, and adding to the sensed data any sensor positional bias update information and sensor angular bias update information to produce updated sensed information. The state of the updated sensed information is propagated in time to produce time updated state estimates of the target position and velocity. The Jacobian of the state dynamics of the target is computed. The state transition matrix for the extended Kalman filter algorithm is computed. The covariance of a state vector comprising the position and velocity states of the target is propagated in time to thereby produce positional error information relating to the target.

DESCRIPTION OF THE INVENTION

It would be desirable to be able to perform sensor tracking and fusion with combined angular and positional registration bias estimation capability independent of supplemental inputs such as GPS and or satellite ephemeris. According to an aspect of the invention, a multi-sensor measurement fusion method produces fused ballistic inertial target track state estimates nominally free of navigational errors attributable to angular and positional sensor registration biases. A method according to an aspect of the invention, given the name Unified Navigation and Inertial Tracking Estimation System (UNITES), may be implemented with the aid of a computer algorithm. The method incorporates an extended Kalman filter algorithm incorporating sensor registration bias scheme requiring no ephemeris or GPS inputs (although they may be used if desired). With sufficient computational resources, the sensor registration bias aspect operates in real time and provides real-time or nominally instantaneous estimate of the angular and positional sensor registration bias errors. The result is that the target is tracked with reduced errors attributable to sensor positional and angular biases. This improved tracking, in turn, allows the target to be attacked with a greater likelihood of success.

Angular sensor bias registration has been addressed through state augmentation, as described in U.S. patent application Ser. No. 11/149,692, filed Jun. 10, 2005 in the name of Boka et al. and entitled "Instantaneous Multisensor Angular Bias Autoregistration" (ISAAC), and "System Calibration using Satellites (SCUS)" represented by U.S. Pat. No. 5,729,234, entitled "Remote alignment system" issued Mar. 17, 1998 in the name of Stetson et al. Sensor positional bias registration error amelioration or correction is described in U.S. patent application Ser. No. 11/504,561 and entitled "Method for Compensating for the Positional Errors of a Sensor," (GPSLess) filed on or about Aug. 14, 2006 in the name of Mookerjee et al.

Figure 1:
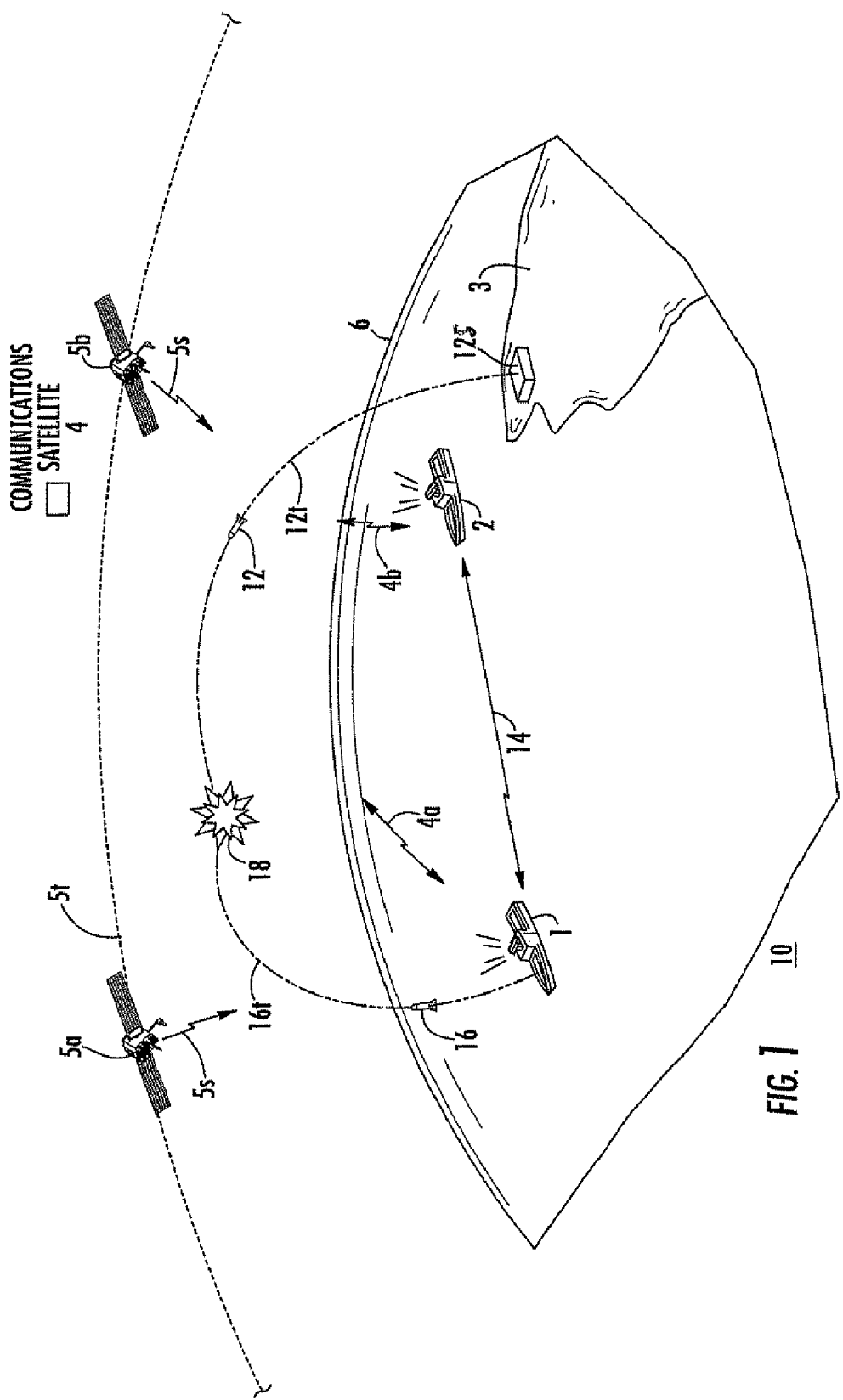
FIG. 1 is a representation of a scenario in which a target is tracked by two or more spaced-apart sensors.
Figure 2:
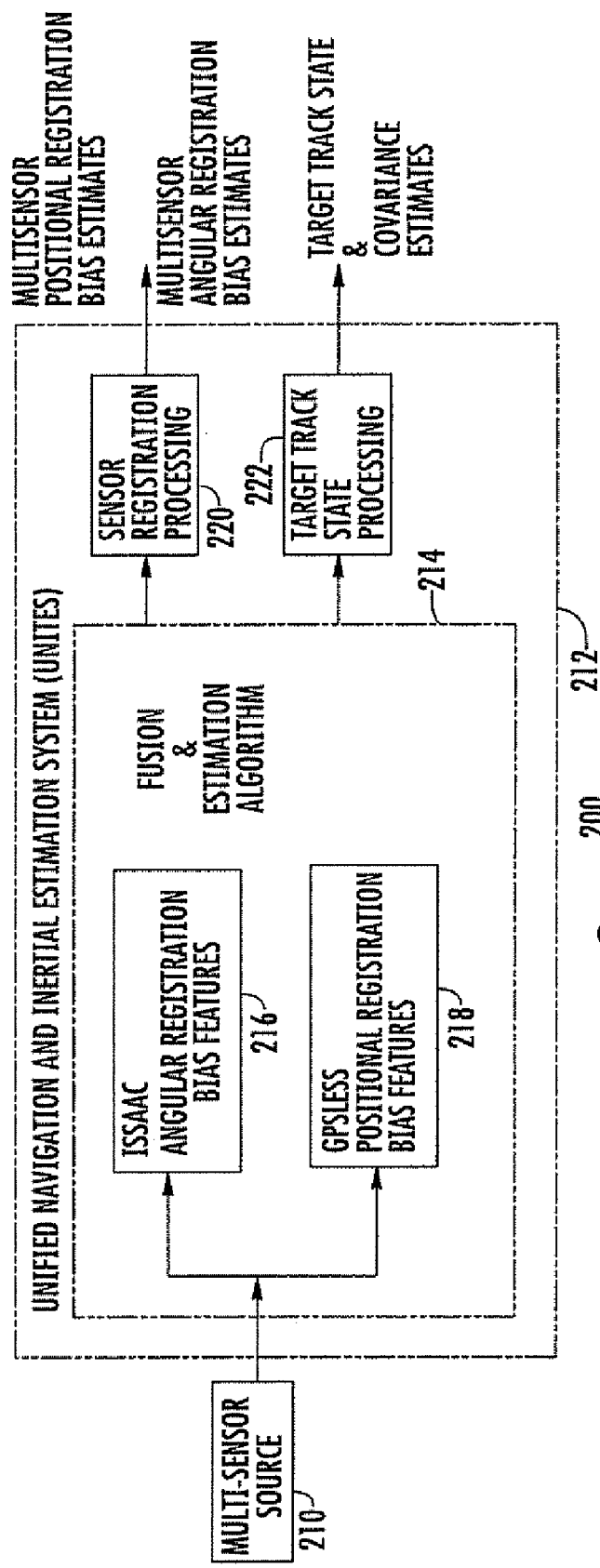
FIG. 2 is a notional representation of a system according to an aspect of the invention.

The method of the present invention in effect merges the capabilities of both ISAAC and GPSLess by new algorithms which enable the angular and positional sensor registration bias errors to be observed separately. FIG. 2 is a simplified notional representation 200 of the uniting of ISAAC with GPSLess to produce an improved UNITES result. In FIG. 2, representation 200 includes a source, illustrated as a block 210, of multi-sensor information representing information about the target(s). This information may be updated occasionally or periodically. The information is made available from sensor block 210 to the Unified Navigation and Inertial Estimation System (UNITES), illustrated as a block 212. UNITES block 212 includes fusion and estimation algorithms in a block 214. The fusion and estimation algorithms fuse or combine some the angular registration bias features of provided by ISAAC 216 with positional registration bias features of GPSLess 218. These fused or combined features are combined with sensor registration processes illustrated as a block 220 and with target track state processing illustrated as a block 222 to produce (a) multisensor positional bias registration bias estimates, (b) multisensor angular registration bias estimates, and (c) target track state and covariance estimates. The multisensor positional bias registration bias estimates, multisensor angular registration bias estimates, and target track state and covariance estimates are, in turn, used by combat and weapon systems (not illustrated), such as those aboard ships 1 and or 2 of FIG. 1, to mitigate the effects of sensor registration biases in the overall fire control process.

Figure 3:
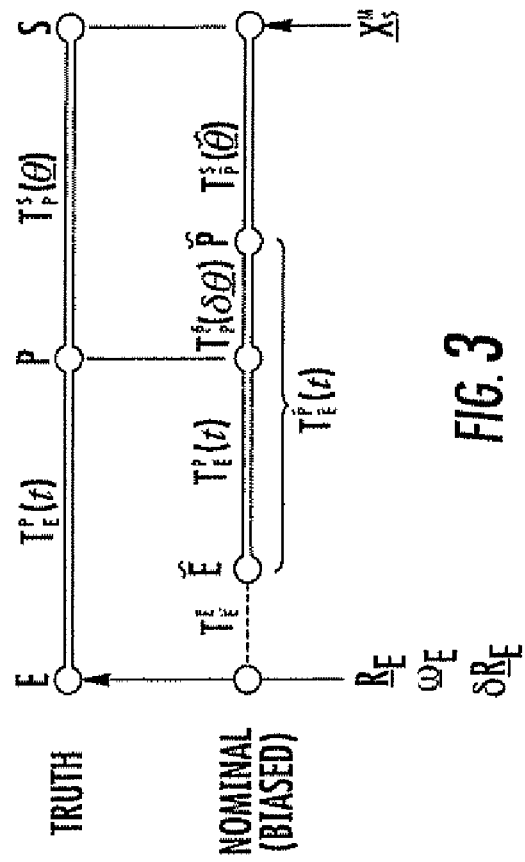
FIG. 3 is a representation of transformations among stable and biased coordinate systems.

FIG. 3 represents coordinate frame topology and vector definitions for analysis, depicted or couched in terms of true and nominal (biased) coordinate frame topologies. These conventions are consistent with Aegis sea-based systems without loss of generality. In FIG. 3, starting at the left end of the upper (Truth) transformation line, the E frame represents the stable space frame, that is, Earth-Centered Earth-Fixed (ECEF), East-North Up (ENU), or Earth-Centered Inertial (ECI). The earth's angular velocity vector $\omega_E$ is known exactly in this frame. The estimate $\hat{R}_E$ of the sensor location vector $R_E$ is known in this frame, where the underscore represents a vector quantity, and the overcaret (^) represents an estimate. The estimate $\hat{R}_E$ differs from the actual location or position based on $$\underline{R}_E = \underline{\hat{R}}_E + \delta\underline{\hat{R}}_E \tag{1}$$

The matrix $T_E^P(t)$ represents the coordinate transformation from the E frame to the P frame, where (t) denotes a time dependency. The P frame represents the platform frame (e.g. Aegis ship deck frame) that may be moving (e.g. wave motion) relative to the E stable space frame. The matrix $T_P^S(\theta)$ represents the coordinate transformation from the P or platform frame to the S or sensor frame, where $\theta$ denotes the actual (unknown) rotation angles between P and S. The S sensor frame represents the measurement sensor coordinate system (i.e. measurement vector $X_S^m$ known exactly in this frame). Note that $\delta\hat{R}_E$ is the estimated sensor registration position bias represented in the E frame.

The bottom line of FIG. 3, which is the nominal or biased transformation line, represents the nominal (biased) coordinate reference system transformations. The $\tilde{E}$ frame represents the biased stable space frame (e.g. biased ECEF, ENU, or ECI) that a filter would mistakenly work within after transforming the measurement vector $X_S^m$ from the S sensor frame to the expected stable frame E using the nominal coordinate transformation matrices $T_P^S(\hat{\tilde{\theta}})$ and $T_E^S(t)(=T_E^S(t))$ (These last two coordinate frame transformations refer to the transformation between the frames as denoted by the subscript and superscript of each term) where $\tilde{P}$ denotes the nominal (biased) platform frame, and the overtilde (~) represents a bias. Note that the biased platform transformation matrix $T_P^P(\delta\tilde{\theta})$ can be represented as a bias in the E frame using the similarity transformation $$T_E^{\tilde{E}} = T_P^E(t) T_P^{\tilde{P}}(\delta\tilde{\theta}) T_E^P(t) \tag{2}$$

It should be noted that there may be a bias between the E and P frames of FIG. 3, which may be taken into account if the bias is significant. If the bias is significant, the UNITES state vector may be augmented to include that bias, as by using a modeling technique similar to that used for $\theta$. For simplicity of description, however, and without the loss of generality, the transformation from the E frame to the P frame is taken as being un-biased and only time dependent.

Figure 4:
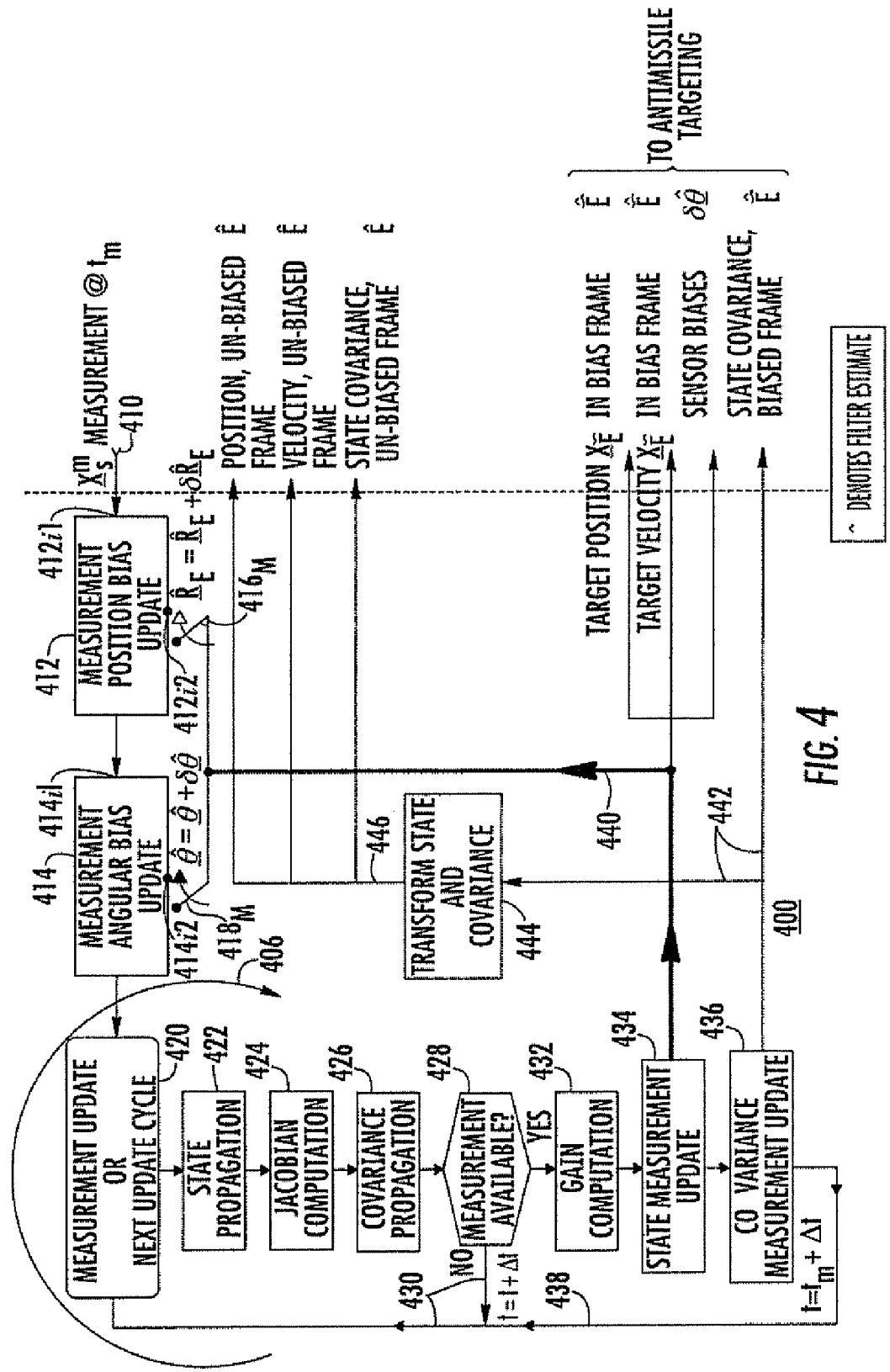
FIG. 4 is a functional block diagram illustrating operation of a system according to an aspect of the invention.

FIG. 4 is a simplified functional block diagram illustrating the operation of an extended Kalman filter system according to an aspect of the invention. In FIG. 4, the process begins with application to an input port 410 of an initial position measurement $X_S^m$ from a sensor (not illustrated in FIG. 4) tracking a ballistic target. In order to develop the filter equations, a model is assumed in which the target is either ballistic (falling under the force of gravity) or else the specific force (i.e. thrust acceleration) is known exactly and can be compensated for. Additionally, it is assumed that atmospheric drag effects are negligible due to the high altitudes at which target tracking occurs, or that atmospheric drag can be properly compensated for. Given these assumptions, the following equations describe the model used for the target kinematics:

$$\underline{\ddot{X}}_E = \frac{-\mu \underline{Z}_E}{|\underline{Z}_E|^3} + \underline{A}_E - \underline{\omega}_E \times (\underline{\omega}_E \times \underline{Z}_E) - 2\underline{\omega}_E \times \underline{\dot{X}}_E \quad (3)$$

$$\underline{Z}_E = \underline{R}_E + \underline{X}_E$$

where:

$\mu$ is the Earth gravitational constant;

$A_E$ is the known specific force which includes (but is not limited to) effects such as higher order gravitational effects; and $X_E$ is the sensed target position reported in the E frame.

For simplicity of explanation, and without loss of generality, the remaining description omits the $A_E$ term for conciseness and includes only the dominant gravity term $\mu$.

The initial sensor-generated position vector $X_S^m$ at time $t_m$, representing the position of the target, is applied from port 410 of FIG. 4 to an input port 412i1 of a measurement position bias update function illustrated as a block 412. Block 412 sets the initial value of the estimated sensor position vector in the stable space frame ($\underline{\hat{R}}_E$) to the nominal bias value ($\underline{\tilde{R}}_E$), $\underline{\hat{R}}_E = \underline{\tilde{R}}_E$. Measurement position bias update function block 412 also updates the estimated sensor position vector using the sensor position bias error estimate applied to second input port 412i2 from the previous UNITES bias estimation event or iteration. Note that block 412 performs this function at every cycle, not just at filter start-up. From block 412, the logic of system 400 of FIG. 4 flows to an input 414i1 of a measurement angular bias update block 414. Block 414 initializes the measurement at time $t_m$ using the nominal value for alignment biases $\underline{\hat{\theta}} = \underline{\tilde{\theta}}$. The measurement angular bias update function block 414 also receives at its second input port 414i2 the sensor alignment bias error estimate $\delta\underline{\hat{\theta}}$ from the previous UNITES bias estimation event, and updates the sensor alignment bias $\delta\underline{\hat{\theta}}$ for the next cycle.

From block 414, the logic 400 of FIG. 4 flows to a measurement update or next update cycle function represented by a block 420. Block 420 determines whether the state and covariance estimates for the current time iteration will include a measurement update. The UNITES function 400 of FIG. 4 nominally operates at a predetermined cycle rate, with measurement updates occurring asynchronously as they are available. If updates are not available, block 420 merely sends the logic on to a state propagation function represented by a block 422.

The target state vector s is:

$$\underline{s} = \begin{Bmatrix} \underline{X}_{\tilde{E}} \\ \underline{\dot{X}}_{\tilde{E}} \\ \delta \underline{R}_E \\ \delta \underline{\theta} \end{Bmatrix} \quad (4)$$

State vector s includes target position, velocity, and positional and angular registration biases for all reporting sensors. Position and velocity vectors are referenced relative to the biased stable space frame $\tilde{E}$. The angular registration bias state vector $\delta\underline{\theta}$ is referenced relative to the platform frame P, and the positional registration bias $\delta\underline{R}_E$ is referenced relative to the biased stable space frame and is constant in that frame.

The dynamics equations (i.e. the nonlinear state derivative equations) are set forth in equations (5). These equations are based on the assumed target kinematics described in relation to equation (3). Additionally, it is assumed that all sensor positional and angular registration biases are constant.

$$\underline{\dot{s}} = \begin{Bmatrix} \underline{\dot{X}}_{\tilde{E}} \\ \underline{\ddot{X}}_{\tilde{E}} \\ \delta \underline{\dot{R}}_E \\ \delta \underline{\dot{\theta}} \end{Bmatrix} = \begin{Bmatrix} \underline{\dot{X}}_{\tilde{E}} \\ \frac{-\mu \underline{Z}_{\tilde{E}}}{|\underline{Z}_{\tilde{E}}|^3} - \underline{\omega}_E \times (\underline{\omega}_E \times \underline{Z}_{\tilde{E}}) - 2\underline{\omega}_E \times \underline{\dot{X}}_{\tilde{E}} \\ \underline{0}_{3\times 1} \\ \underline{0}_{3\times 1} \end{Bmatrix} \quad (5)$$

From block 420 of FIG. 4, the logic 400 flows to a state propagation function illustrated as a block 422. The state propagation block 422 of logic 400 of FIG. 4 propagates (in time) the UNITES state vector in equation (4) to produce time updated state estimates of the target position and velocity. Time propagation of the state vector is performed in block 422 by numerically integrating the state derivative vector from the previous time $t_{i-1}$, to the current time $t_i$, where the subscript i refers to the filter cycle iteration:

$$\hat{s}(t_i) = \hat{s}(t_{i-1}) + \int_{t_{i-1}}^{t_{i-1}+\Delta t} \hat{\dot{s}}(\tau) d\tau \quad (6)$$

For the integration process, a high order numerical integration algorithm, such as the $2^{nd}$ order or $4^{th}$ order Runge Kutta algorithm might be used. The incremental time step $\Delta t$ refers to either the nominal update cycle time or the incremental time step from the last cycle time to the current measurement time $t_m$ (i.e., $\Delta t = t_m - t_{i-1}$). At the first iteration, the state propagation function of block 422 also initializes the state for the subsequent iterations. From state propagation block 422, the logic of FIG. 4 flows to a Jacobian computation represented by a block 424.

The Jacobian computation function 424 of FIG. 4 computes the Jacobian of the state dynamics of the target, and subsequently computes, from the state dynamics of the target, the state transition matrix for the UNITES extended Kalman filter algorithm. The UNITES Jacobian matrix formulation of the state dynamics provides observability into the sensor alignment bias through the gravitational and coriolis forces. The Jacobian J of the state dynamics equation is given by $$J = \left[\frac{\partial \dot{s}}{\partial s}\right] = \left[\frac{\partial \dot{s}}{\partial \underline{X}_{\tilde{E}}} \; \frac{\partial \dot{s}}{\partial \underline{\dot{X}}_{\tilde{E}}} \; \frac{\partial \dot{s}}{\partial \delta \underline{R}_E} \; \frac{\partial \dot{s}}{\partial \delta \underline{\theta}}\right] = \begin{bmatrix} 0_{3\times 3} & I_{3\times 3} & 0_{3\times 3} & 0_{3\times 3} \\ \frac{\partial \ddot{X}_{\tilde{E}}}{\partial X_{\tilde{E}}} & \frac{\partial \ddot{X}_{\tilde{E}}}{\partial \dot{X}_{\tilde{E}}} & \frac{\partial \ddot{X}_{\tilde{E}}}{\partial \delta R_E} & \frac{\partial \ddot{X}_{\tilde{E}}}{\partial \delta \theta} \\ 0_{3\times 3} & 0_{3\times 3} & 0_{3\times 3} & 0_{3\times 3} \\ 0_{3\times 3} & 0_{3\times 3} & 0_{3\times 3} & 0_{3\times 3} \end{bmatrix} \quad (7)$$

where:

$$\frac{\partial \ddot{\underline{X}}_E}{\partial \underline{X}_E} = -\frac{\mu}{(\hat{Z}_E \cdot \hat{Z}_E)^{\frac{3}{2}}} \left[ I_{3\times 3} - \frac{3}{(\hat{Z}_E \cdot \hat{Z}_E)} [\hat{Z}_E \cdot \hat{Z}_E^T] \right] - [\![\hat{\omega}_E]\!] \cdot [\![\hat{\omega}_E]\!]$$

$$\frac{\partial \ddot{\underline{X}}_E}{\partial \dot{\underline{X}}_E} = -2 \cdot [\![\hat{\omega}_E]\!]$$

$$\frac{\partial \ddot{\underline{X}}}{\partial \delta R_E} = 0_{3\times 1}$$

$$\frac{\partial \ddot{\underline{X}}_E}{\partial \delta \underline{\theta}} = -\frac{\mu}{(\hat{Z}_E \cdot \hat{Z}_E)^{\frac{3}{2}}} \left[ I_{3\times 3} - \frac{3}{(\hat{Z}_E \cdot \hat{Z}_E)} [\hat{Z}_E \cdot \hat{Z}_E^T] \right] \cdot [\![\hat{R}_E]\!] \cdot \hat{T}_P^E(t_i) - 2 \cdot [\![\dot{\hat{X}}_E]\!] \cdot$$

$$[\![\hat{\omega}_E]\!] \cdot \hat{T}_P^E(t_i) + [\![[\![\hat{\omega}_E]\!] \cdot [\![\hat{X}_E]\!] \cdot [\![\hat{\omega}_E]\!] + [\![\hat{\omega}_E]\!] \cdot [\![\hat{R}_E]\!] \cdot [\![\hat{\omega}_E]\!] +$$

$$[\![[\![\hat{\omega}_E]\!] \cdot \hat{X}_E]\!] \cdot [\![\hat{\omega}_E]\!] + [\![[\![\hat{\omega}_E]\!] \cdot \hat{R}_E]\!] \cdot [\![\hat{\omega}_E]\!] - [\![\hat{\omega}_E]\!] \cdot [\![\hat{\omega}_E]\!] \cdot [\![\hat{R}_E]\!]] \cdot \hat{T}_P^E(t_i) \text{ and}$$

$$\hat{R}_E = \hat{T}_E^{\bar{E}} \cdot \hat{R}_E$$

$$\hat{\omega}_E = \hat{T}_E^{\bar{E}} \cdot \omega_E$$

$$\hat{T}_E^{\bar{E}} = T_P^E(t_i) \cdot [I_{3\times 3} + [\![\hat{\theta}]\!]] \cdot T_E^P(t_i)$$

The $[\![\bullet]\!]$ notation denotes a skew symmetric matrix of the vector argument.

The state transition matrix used for the time propagation of the UNITES error covariance can be approximated including up to $2^{nd}$ order terms:

$$\Phi \approx I + J\Delta t + 0.5 J^2 \Delta t^2 \quad (8)$$

From Jacobian computation block 424, the logic 400 of FIG. 4 flows to a block 426, which represents the use of the state transition matrix to time propagate the covariance of a state vector comprising the position and velocity states of the target. The covariance propagation function performed by block 426 is the traditional Kalman filter time propagation of the state covariance matrix utilizing the state transition matrix. This function will nominally operate faster than the measurement processing to reduce non-linear effects when measurement updates occur at slow update rates. At the first iteration, the covariance propagation function of block 426 also initializes the state covariance for the subsequent iterations. Time propagation of the UNITES error covariance matrix $P(t_i)$ is performed with the following equation:

$$P(t_i) = \Phi P(t_{i-1}) \Phi^T + Q \quad (9)$$

where:

Q is the UNITES state noise matrix.

The state noise matrix Q may be determined using the following equation:

$$Q = \int_0^{\Delta t} \Phi W \Phi^T d\tau \quad (10)$$

where:

$W = E(w(\tau)w(\tau)^T)$; and $w(\tau)$ is the 12×1 state noise vector of white noise.

From block 426 of FIG. 4, the logic 400 flows to a decision block 428. Decision block 428 determines if a position measurement is currently available. If a measurement is not currently available, then time is incremented by the nominal $\Delta t$ propagation time rate, the logic leaves decision block 428 by the "No" output, and control is passed by way of a path 430 to block 420 at the start of the iteration loop 406. If, on the other hand, a measurement is available, then the logic of FIG. 2 leaves decision block 428 by the "Yes" output, and proceeds to a block 432, representing a gain computation.

The gain computation block 432 of FIG. 4 constructs the standard Kalman filter gain matrix K using the measurement matrix and the error covariance matrix $$K = P(t_i) \cdot H^T \cdot (H \cdot P(t_j) \cdot H^T + R)^{-1} \quad (11)$$

where:

$$H = [I_{3\times 3} \ 0_{3\times 3} \ I_{3\times 3} \ 0_{3\times 3}] \quad (12)$$

is the measurement matrix; and

R is the measurement noise covariance matrix associated with the currently reporting sensor defined in the stable space frame $$R = \hat{T}_P^E(t_i) \cdot \hat{T}_S^P(\hat{\underline{\theta}}) \cdot \Sigma \cdot \hat{T}_P^S(\hat{\underline{\theta}}) \cdot \hat{T}_E^P(t_i) \quad (13)$$

with $\Sigma$ denoting the measurement noise matrix as represented in the sensor frame.

It should be noted that the gain computation expressed by equations (11) and (12) is applicable only in the case in which the measurement update is of the target position only. If the measurement update includes both target position and target velocity information, the gain of the Kalman filter is generated in accordance with equation (11) with the measurement matrix H redefined as $$H = \begin{bmatrix} I_{3\times 3} & 0_{3\times 3} & I_{3\times 3} & 0_{3\times 3} \\ 0_{3\times 3} & I_{3\times 3} & 0_{3\times 3} & 0_{3\times 3} \end{bmatrix} \quad (14)$$

and including the effect of the velocity in the second row.

From gain computation block 432, the logic of FIG. 4 flows to a block 434, representing the state measurement and state residuals update including the sensor registration bias estimate. The state vector is updated using $$\hat{s} = \hat{s} + K \cdot \Delta m \quad (15)$$

where:
the measurement residual $\Delta m$ is defined as $$\Delta m = \hat{T}_P^E(t_i) \cdot \hat{T}_S^P(\hat{\theta}) \cdot X_S^m(t_i) - H \cdot \hat{s} \quad (16)$$

The updated state measurements are made available by way of path 440 to sensor positional bias update switch function 416M and sensor angular bias update switch function 418M, for inclusion in the next iteration. The updated state measurements produced by block 434 include the updates to the target missile position $X_{\hat{E}}$ and velocity $\dot{X}_{\hat{E}}$ in the estimated bias frame $\hat{E}$. The updated state measurements also include the update to the sensor biases for position $\delta R_E$ and angle $\delta \underline{\theta}$. The updated state measurements are made available by connections to path 440 for use by an antimissile targeting arrangement, not illustrated in FIG. 4. Note that, according to an advantageous result of this processing, as the updated angular bias estimates converge to the true bias, the biased frame converges toward the true sensor frame.

From block 434 of FIG. 4, the logic 400 flows to a further block 436, representing the updating of the covariance measurement. The covariance measurement update function of block 436 performs the measurement update of the state covariance matrix $$P(t_i) = (I - K \cdot H) \cdot P(t_i) \cdot (I - K \cdot H)^T + K \cdot R \cdot K^T \quad (17)$$

which is made available by way of path 442 to a block 444 representing a transformation of the state and covariance to an estimated unbiased frame $\hat{E}$. The state covariance in estimated biased frame $\hat{E}$ is also made available for external use for fire control or guidance purposes for missile targeting. The logic flow 400 continues with updating of the time $t=tm+\Delta t$, and the logic returns by way of path 438 to block 420 to begin another iteration around loop 406.

State and covariance transformation block 444 of FIG. 4 performs transformations of target missile position, velocity, and covariance to the estimated stable space frame $\hat{E}$ using equations (18)

$$\hat{X}_{\hat{E}} = T_{\hat{E}}^{\hat{E}} \cdot \hat{X}_{\hat{E}}$$

$$\hat{\dot{X}}_{\hat{E}} = T_{\hat{E}}^{\hat{E}} \cdot \hat{\dot{X}}_{\hat{E}}$$

$$P_{\hat{X}\hat{X}} = P_{\tilde{X}\tilde{X}} + [\![\hat{X}_{\hat{E}}]\!] \cdot T_P^{\hat{E}}(t_1) \cdot P_{\theta\theta} \cdot T_{\hat{E}}^P(t_i) \cdot [\![\hat{X}_{\hat{E}}]\!]^T +$$
$$T_{\hat{E}}^{\hat{E}} \cdot P_{\tilde{X}\theta} \cdot T_{\hat{E}}^P(t_i) \cdot [\![\hat{X}_{\hat{E}}]\!]^T + [\![\hat{X}_{\hat{E}}]\!] \cdot T_P^{\hat{E}}(t_i) \cdot P_{\tilde{X}\theta}^T \cdot T_{\hat{E}}^{\hat{E}}$$

$$P_{\hat{X}\hat{X}} = P_{\tilde{X}\tilde{X}} + [\![\hat{\dot{X}}_{\hat{E}}]\!] \cdot T_P^{\hat{E}}(t_i) \cdot P_{\theta\theta} \cdot T_{\hat{E}}^P(t_i) \cdot [\![\hat{\dot{X}}_{\hat{E}}]\!]^T +$$
$$T_{\hat{E}}^{\hat{E}} \cdot P_{\tilde{\dot{X}}\theta} \cdot T_{\hat{E}}^P(t_i) \cdot [\![\hat{\dot{X}}_{\hat{E}}]\!]^T + [\![\hat{\dot{X}}_{\hat{E}}]\!] \cdot T_P^{\hat{E}}(t_i) \cdot P_{\tilde{\dot{X}}\theta}^T \cdot T_{\hat{E}}^{\hat{E}}$$

-continued where:

$$P(t_i) = \begin{bmatrix} P_{\tilde{X}\tilde{X}} & P_{\tilde{X}\tilde{\dot{X}}} & P_{\tilde{X}\delta X} & P_{\tilde{X}\theta} \\ P_{\tilde{X}\tilde{X}}^T & P_{\tilde{\dot{X}}\tilde{\dot{X}}} & P_{\tilde{\dot{X}}\delta X} & P_{\tilde{\dot{X}}\theta} \\ P_{\tilde{X}\delta X}^T & P_{\tilde{\dot{X}}\delta X}^T & P_{\delta X \delta X} & P_{\delta X \theta} \\ P_{\tilde{X}\theta}^T & P_{\tilde{\dot{X}}\theta}^T & P_{\delta X \theta}^T & P_{\theta\theta} \end{bmatrix}$$

$$\hat{T}_E^{\hat{E}} = T_P^E(t_i) \cdot [I_{3\times3} + [\![\hat{\theta}]\!]] \cdot T_E^P(t_i)$$

The transformed position, velocity and covariance in the stable space frame are made available by way of paths 446 for use by an antimissile targeting arrangement, not illustrated in FIG. 4.

At the end of each iteration through the logic 400 of FIG. 4, the sensor position vector estimate $\hat{\underline{R}}_E$ is updated using $\hat{\underline{R}}_E = \hat{\underline{R}}_E + \delta\hat{\underline{R}}_E$. At initialization, the sensor position vector assumes the nominal value $\hat{\underline{R}}_E = \tilde{\underline{R}}_E$. Also at the end of each iteration, the sensor angular bias estimate $\hat{\underline{\theta}}$ is updated using $\hat{\underline{\theta}} = \hat{\underline{\theta}} + \delta\hat{\underline{\theta}}$. At initialization, the sensor angular bias estimate assumes the nominal value of $\hat{\underline{\theta}} = \tilde{\underline{\theta}}$.

What is claimed is:

1. A method for compensating for the positional and alignment errors of a sensor tracking a target with known acceleration, which sensor generates sensed information, said method comprising the steps of:

defining the estimator state given by $$\underline{s} = \begin{Bmatrix} \underline{X}_{\hat{E}} \\ \underline{\dot{X}}_{\hat{E}} \\ \delta \underline{R}_{\hat{E}} \\ \delta \underline{\theta} \end{Bmatrix}$$

comprising the target position $\underline{X}_E$ and velocity $\underline{\dot{X}}_E$ and the positional bias $\delta\underline{R}_E$ of the sensor and the angular bias of the sensor $\delta\underline{\theta}$;

applying to said sensed information any sensor positional bias update information and angular bias information to produce updated sensed information which ultimately provides improved target state information;

propagating state estimates from the previous time $t_{i-1}$ to the current time $t_i$ where the subscript i refers to the filter cycle iteration to produce time updated state estimates according to $$\hat{s}(t_i) = \hat{s}(t_{i-1}) + \int_{t_{i-1}}^{t_{i-1}+\Delta 1} \hat{\dot{s}}(\tau) d\tau;$$

computing the Jacobian of the state dynamics of the target according to $$J = \begin{bmatrix} \frac{\partial \dot{s}}{\partial s} \end{bmatrix} = \begin{bmatrix} \frac{\partial \dot{s}}{\partial X_{\hat{E}}} & \frac{\partial \dot{s}}{\partial \dot{X}_{\hat{E}}} & \frac{\partial \dot{s}}{\partial \delta R_{\hat{E}}} & \frac{\partial \dot{s}}{\partial \delta \theta} \end{bmatrix} = \begin{bmatrix} 0_{3\times3} & I_{3\times3} & 0_{3\times3} & 0_{3\times3} \\ \frac{\partial \ddot{X}_{\hat{E}}}{\partial X_{\hat{E}}} & \frac{\partial \ddot{X}_{\hat{E}}}{\partial \dot{X}_{\hat{E}}} & \frac{\partial \ddot{X}_{\hat{E}}}{\partial \delta R_{\hat{E}}} & \frac{\partial \ddot{X}_{\hat{E}}}{\partial \delta \theta} \\ 0_{3\times3} & 0_{3\times3} & 0_{3\times3} & 0_{3\times3} \\ 0_{3\times3} & 0_{3\times3} & 0_{3\times3} & 0_{3\times3} \end{bmatrix}$$

where:

$$\frac{\partial \ddot{X}_E}{\partial X_E} = -\frac{\mu}{(\hat{Z}_E \cdot \hat{Z}_E)^{\frac{3}{2}}} \left[ I_{3\times 3} - \frac{3}{(\hat{Z}_E \cdot \hat{Z}_E)}[\hat{Z}_E \cdot \hat{Z}_E^T] \right] - [\![\hat{\omega}_E]\!] \cdot [\![\hat{\omega}_E]\!]$$

$$\frac{\partial \ddot{X}_E}{\partial \dot{X}_E} = -2 \cdot [\![\hat{\omega}_E]\!]$$

$$\frac{\partial \ddot{X}}{\partial \delta R_E} = 0_{3\times 1}$$

$$\frac{\partial \ddot{X}_E}{\partial \delta \underline{\theta}} = -\frac{\mu}{(\hat{Z}_E \cdot \hat{Z}_E)^{\frac{3}{2}}} \left[ I_{3\times 3} - \frac{3}{(\hat{Z}_E \cdot \hat{Z}_E)}[\hat{Z}_E \cdot \hat{Z}_E^T] \right] \cdot [\![\hat{R}_E]\!] \cdot \hat{T}_p^E(t_i) - 2 \cdot [\![\hat{\dot{X}}_E]\!] \cdot$$

$$[\![\hat{\omega}_E]\!] \cdot \hat{T}_p^E(t_i) + [[\![\hat{\omega}_E]\!] \cdot [\![\hat{X}_E]\!] \cdot [\![\hat{\omega}_E]\!] + [\![\hat{\omega}_E]\!] \cdot [\![\hat{R}_E]\!] \cdot [\![\hat{\omega}_E]\!] +$$

$$[[\![\hat{\omega}_E]\!] \cdot \hat{X}_E] \cdot [\![\hat{\omega}_E]\!] + [[\![\hat{\omega}_E]\!] \cdot \hat{R}_E] \cdot [\![\hat{\omega}_E]\!] - [\![\hat{\omega}_E]\!] \cdot [\![\hat{\omega}_E]\!] \cdot [\![\hat{R}_E]\!] \cdot \hat{T}_p^E(t_i)$$

and where $$\hat{R}_E = \hat{T}_E^E \cdot \hat{R}_E$$

$$\hat{\omega}_E = \hat{T}_E^E \cdot \omega_E$$

$$\hat{T}_E^E = T_p^E(t_i) \cdot [I_{3\times 3} + [\![\hat{\theta}]\!]] \cdot T_E^P(t_i)$$

and where
- J is the Jacobian of the state dynamics of the target;
- s represents the sensor frame;
- underscore (_) represent a vector quantity;
- overcaret (^) represents an estimate of the argument;
- overtilde (~) represents a bias term;
- $(\ )^T$ represents the transpose of the argument matrix;
- $0_{3\times 3}$ is a 3×3 matrix in which all components are zero;
- $I_{3\times 3}$ is a 3×3 identity matrix (ones along the principal diagonal and zeroes elsewhere);
- Z is the vector sum of the sensor position vector with respect to the center of the Earth, and the relative position vector of the sensed object with respect to the sensor position;
- μ is the Earth's gravitational constant;
- ω is the Earth's angular velocity vector;
- T represents a coordinate system transformation matrix;
- P represents a covariance matrix of an estimated state vector;
- Q represents the process noise covariance matrix used by a Kalman filter; and
- the [•] notation denotes a skew symmetric matrix of the vector argument;
    computing, from said Jacobian, the state transition matrix for the extended Kalman filter algorithm $$\Phi \approx I + J\Delta t + 0.5 J^2 \Delta t^2$$

where
- Φ is the state transition matrix truncated to include no more than second-order terms;
- I is a 12×12 identity matrix;
- J is a 12×12 Jacobian matrix;

and
   using said state transition matrix, time propagating the covariance of a state vector comprising the position and velocity states of said target and the positional bias of the sensor given by $$P(t_i) = \Phi P(t_{i-1}) \Phi^T + Q.$$

2. A method for target tracking, said method comprising the steps of:
   sensing a target with at least one sensor subject to positional bias and angular bias, to thereby produce target representative sensed signals subject to sensor positional and angular biases;
   updating said sensor positional bias and said sensor angular bias with any sensor positional bias updates and sensor angular bias updates, respectively, to thereby produce sensor positional-bias and sensor angular-bias updated target representative sensed signals;
   non-linear time propagating the state that includes at least sensor positional-bias and sensor angular-bias sensed signals and the target positional and velocity states of said sensor positional-bias and sensor angular-bias updated target representative signals to produce time updated target states and sensor positional and angular biases;
   computing the Jacobian of the state dynamics of a target model to produce the state transition matrix for extended Kalman filtering;
   time propagating the covariance of a state vector comprising at least position and velocity of said target and positional and angular bias of said sensor, to thereby produce time updated state covariance;
   determining if a sensor measurement update is available;
   if said sensor measurement update is not available, repeating said steps of state time propagating, computing the Jacobian, and covariance time propagating;
   if said sensor measurement update is available, determining the Kalman filter gain;
   determining the Kalman measurement residual comprising (a) the time updated target states and sensor positional and angular biases and (b) the sensor measurements;
   weighting said Kalman measurement residual with said gain to produce state correction, and adding said state correction to said (a) the time updated target states and sensor positional and angular biases and (b) the sensor measurements to thereby produce (i) target position and velocity state updates and (ii) said sensor positional bias updates and sensor angular bias updates;
   using said Kalman gain, covariance measurement propagating the covariance of a state vector comprising at least position and velocity of said target and positional and angular bias of said sensor, to thereby produce measurement updated state covariance consisting of (i) target position and velocity measurement covariance updates and (ii) said sensor positional bias measurement covariance updates and sensor angular bias measurement covariance updates.

3. A method according to claim 2, further comprising the step of transformation of coordinates of the state vector and state covariance of said Kalman filter wherein said transformation of coordinates is between the sensor bias filter frame and an unbiased filter frame.

4. A method according to claim 3, wherein said step of transformation of coordinates is performed using $$\hat{X}_{\hat{E}} = T_E^{\hat{E}} \cdot \hat{X}_E$$

$$\hat{\dot{X}}_{\hat{E}} = T_E^{\hat{E}} \cdot \hat{\dot{X}}_E$$

$$P_{\hat{X}\hat{X}} = P_{\tilde{X}\tilde{X}} + [\![\hat{X}_{\hat{E}}]\!] \cdot T_P^{\hat{E}}(t_1) \cdot P_{\theta\theta} \cdot$$

$$T_{\hat{E}}^P(t_i) \cdot [\![\hat{X}_{\hat{E}}]\!]^T + T_{\hat{E}}^{\hat{E}} \cdot P_{\tilde{X}\theta} \cdot T_{\hat{E}}^P(t_i) \cdot$$

$$[\![\hat{X}_{\hat{E}}]\!]^T + [\![\hat{X}_{\hat{E}}]\!] \cdot T_P^{\hat{E}}(t_i) \cdot P_{\tilde{X}\theta}^T \cdot T_E^{\hat{E}}$$

$$P_{\hat{X}\hat{X}} = P_{\tilde{X}\tilde{X}} + [\![\hat{\dot{X}}_{\hat{E}}]\!] \cdot T_P^{\hat{E}}(t_1) \cdot P_{\theta\theta} \cdot T_{\hat{E}}^P(t_i) \cdot [\![\hat{\dot{X}}_{\hat{E}}]\!]^T +$$

$$T_E^{\hat{E}} \cdot P_{\dot{X}\theta} \cdot T_{\hat{E}}^P(t_i) \cdot [\![\hat{\dot{X}}_{\hat{E}}]\!] \cdot T_P^{\hat{E}}(t_i) \cdot P_{\dot{X}\theta}^T \cdot T_E^{\hat{E}}$$

where:

underscore (_) represent a vector quantity;

overcaret (^) represents an estimate of the argument;

overtilde (~) represents a bias term;

$[\![\cdot]\!]$ denotes a skew symmetric matrix of the vector argument;

$[\![\cdot]\!]^T$ denotes the transpose of a skew symmetric matrix of the vector argument;

$\hat{X}_E$ is the estimated target position vector represented in the biased frame;

$T_E^{\hat{E}}$ is the coordinate transformation from the true biased frame to the estimated biased frame;

$\hat{\dot{X}}_{\hat{E}}$ is the estimated target velocity vector represented in the biased frame;

$\hat{\dot{X}}_E$ is the estimated target velocity vector represented in the estimated biased frame;

$P_{XX}$ is the 3×3 covariance matrix of the target position vector with respect to the estimated biased frame;

$P_{\tilde{X}\tilde{X}}$ is the 3×3 covariance matrix in the true bias frame;

$T_P^{\hat{E}}(t_i)$ is the coordinate transformation from the platform frame to the estimated biased frame at time $t_i$;

$P_{\theta\theta}$ is the 3×3 covariance matrix of the estimated angular bias error with respect to the true biased frame;

$P_{x\theta}$ is the 3×3 cross-covariance matrix between the target position state and the angular biased state with respect to the true biased frame;

$T_{\hat{E}}^P(t_i)$ is the transpose of $T_P^{\hat{E}}(t_i)$;

$$P(t_i) = \begin{bmatrix} P_{\hat{X}\hat{X}} & P_{\hat{X}\hat{X}} & P_{\hat{X}\delta X} & P_{\hat{X}\theta} \\ P_{\hat{X}\hat{X}}^T & P_{\hat{X}\hat{X}} & P_{\hat{X}\delta X} & P_{\hat{X}\theta} \\ P_{\hat{X}\delta X}^T & P_{\hat{X}\delta X}^T & P_{\delta X\delta X} & P_{\delta X\theta} \\ P_{\hat{X}\theta}^T & P_{\hat{X}\theta}^T & P_{\delta X\theta}^T & P_{\theta\theta} \end{bmatrix} \text{ and}$$

$$\hat{T}_E^{\hat{E}} = T_P^E(t_i) \cdot [I_{3\times 3} + \lfloor \hat{\theta} \rfloor] \cdot T_E^P(t_i).$$

5. A method according to claim 2, wherein said step of determining the Kalman filter gain comprises the step of calculating the Kalman filter gain matrix $$K = P(t_i)H^T[HP(t_i)H^T + R]^{-1}$$

where:

$\cdot^T$ represents the transpose of the argument;

$P(t_i)$ is a covariance matrix of an estimated state vector evaluated at a time i;

$H = [I_{3\times 3}\ 0_{3\times 3}\ I_{3\times 3}\ 0_{3\times 3}]$ is the measurement matrix; and R is the measurement noise covariance matrix associated with the currently reporting sensor.

6. A method according to claim 2, further comprising, after said step of determining the Kalman filter gain, the steps of:

generating updates of the states of said target and of the covariance of said states of said target as follows $$\hat{s} = \hat{s} + \Delta m$$

where:

the measurement residual Δm is defined as $$\Delta m = \hat{T}_P^E \cdot \hat{T}_S^P(\hat{\theta}) \cdot X_S^m - H \cdot s$$

$\hat{T}_P^E$ is the coordinate transformation matrix from the platform frame to the estimated bias frame;

$\hat{T}_S^P(\hat{\theta})$ is the coordinate transformation matrix from the sensor frame to the platform frame based on the estimated angular bias $X_S^m$ the target position measurement vector with respect to the sensor frame;

$H = [I_{3\times 3}\ 0_{3\times 3}\ I_{3\times 3}\ 0_{3\times 3}]$ is the measurement matrix.

7. A method according to claim 4, further comprising, after said step of time propagating the covariance of a state vector comprising the position and velocity states of said target, the step of determining if target position and target velocity information are available, and if target position and target velocity are available, performing the further steps of:

calculating gain of the Kalman filter to generate Kalman filter gain in accordance with $$K = P(t_i)H^T[HP(t_i)H^T + R]^{-1}$$

where:

$P(t_i)$ is a covariance matrix of an estimated state vector evaluated at a time i;

$$H = \begin{bmatrix} I_{3\times 3} & 0_{3\times 3} & I_{3\times 3} & 0_{3\times 3} \\ 0_{3\times 3} & I_{3\times 3} & 0_{3\times 3} & 0_{3\times 3} \end{bmatrix}$$

is the measurement matrix; and

R is the measurement noise covariance matrix associated with the currently reporting sensor.

8. A method for estimating the position of a target with the aid of a sensor the position and angular orientation of which are not known accurately, said method comprising the steps of:

operating said sensor to generate sensed information relating to the position of said target;

adding to said sensed data any sensor positional bias update information and sensor angular bias information to produce updated sensed information;

propagating the state of said updated sensed information to produce time updated state estimates of the target position and velocity;

computing the Jacobian of the state dynamics of the target;

computing the state transition matrix for the extended Kalman filter algorithm; and time propagating the covariance of a state vector comprising the position and velocity states of said target to thereby produce positional error information and angular bias information relating to said target tracking.

9. A method for estimating the position of a sensor and the angular bias orientation of a sensor, said method comprising the steps of:

operating a sensor to generate sensed data relating to a target, said data being contaminated by sensor positional bias errors and angular bias registration errors;

adding to said sensed data any sensor positional bias update information and sensor angular bias update information to produce updated sensed information;

propagating the state of said updated sensed information to produce time updated state estimates of the target position and velocity;

computing the Jacobian of the state dynamics of the target;

computing the state transition matrix for the extended Kalman filter algorithm; and time propagating the covariance of a state vector comprising the position and velocity states of said target.

10. A method for estimating the error in the position of a sensor and the angular bias orientation of the sensor, said method comprising the steps of:

operating a sensor to generate data relating to a target, said data being contaminated by sensor positional bias errors and angular bias registration errors operating said sensor to generate sensed information relating to the target;

adding to said sensed data any sensor positional bias update information and sensor angular bias update information to produce updated sensed information;

propagating the state of said updated sensed information to produce time updated state estimates of the target position and velocity;

computing the Jacobian of the state dynamics of the target;

computing the state transition matrix for the extended Kalman filter algorithm;

time propagating the covariance of a state vector comprising the position and velocity states of said target to thereby produce positional error information relating to said target.

* * * * *